Nov. 20, 1951 G. HALVERSON ET AL 2,575,808
CONTACT MOUNTING
Filed June 17, 1946
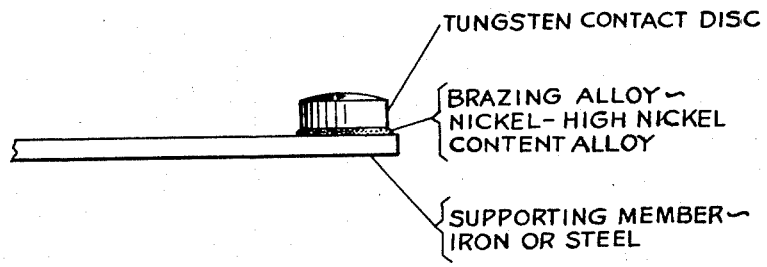
Gilbert Halverson
John D. Kleis
INVENTORS
BY George F. Mueller
ATTORNEY Patented Nov. 20, 1951

2,575,808

UNITED STATES PATENT OFFICE 2,575,808

CONTACT MOUNTING

Gilbert Halverson, Libertyville, and John D. Kleis, Lake Forest, Ill., assignors to Fansteel Metallurgical Corporation, North Chicago, Ill., a corporation of New York Application June 17, 1946, Serial No. 677,203

1 Claim. (Cl. 200—166)

This invention relates to electrical contact assemblies and to the method of making the contact assemblies, particularly assemblies of tungsten contact discs mounted upon iron or steel backing or supporting members.

Electrical contact units for ignition systems of internal combustion engines generally consist of two parts. The stationary contact assembly consists of a screw having a tungsten contact disc brazed or welded to one end of the screw. The movable contact assembly consists of a steel or iron breaker arm to which has been welded or brazed a tungsten contact disc. These assemblies are generally made by placing a thin wafer of copper or a copper alloy brazing material upon the breaker arm or iron supporting member and then placing the tungsten disc over the wafer of brazing material. The area of the brazing wafer or material is substantially the same as that of the contact disc or member. The assembly is placed in a jig and heated to the required brazing temperature for the particular brazing material employed.

The tungsten contact points of these assemblies, when allowed to remain idle, become dirty and covered with a dark colored film of growth. This is particularly noticeable when the assemblies are held in a warm, humid atmosphere. The deposit of dark colored material begins on the side of the tungsten disc adjacent the junction between the disc and the brazing material. This deposit continues to advance or grow on the sides of the tungsten disc toward the face of the disc and then gradually creeps or continues over the face of the disc. After only two or three days in a warm, humid atmosphere the entire surface of the tungsten disc may be covered with the dark deposit which in appearance resembles cob webs or molds. In the first stages of the formation of this deposit, the film first appears amber in color and as the thickness increases it becomes almost black in color. In the early stages of the formation of this deposit, the material is flaky and brittle and in physical properties resembles dried varnish. The thickness of the deposit is greater adjacent the brazing junction and gradually decreases in thickness with an increase in the distance from the brazing junction to the center of the contact face.

The deposit is brittle and may be removed by scraping. It has a relatively high electrical resistance and thereby materially impairs the characteristics of the electrical contacts, a very thin film being sufficient to cause an open circuit at the low voltages usual in automotive ignition systems. It is also quite brittle and in actual use small portions will become chipped and broken off, further adding to the difficulties in the use of the contact assemblies.

One of the objects of this invention is to provide a method of making contact assemblies consisting of an iron or steel backing or supporting member and a tungsten contact element whereby the formation of the dark colored deposit on the tungsten contact member is eliminated.

A further object of this invention is to provide a contact assembly which may be stored in a warm, humid atmosphere without the formation of this characteristic dark colored deposit.

Other objects and advantages of the invention will become apparent from the detailed description and claim which follow.

It has been discovered that the formation of the dark colored deposit on the edges and over the face of a tungsten contact disc may be inhibited and substantially eliminated by the use of a brazing material consisting of nickel or a low melting point nickel alloy in which the nickel constitutes the major portion of the alloy.

The manufacture of the contact assemblies remains the same so far as the manipulative steps are concerned. The usual copper or copper alloy brazing wafer is replaced by a nickel wafer or a nickel alloy wafer. It is obvious that the temperatures employed during brazing will differ because of the higher melting point of nickel. The precise temperatures are, of course, dependent upon the particular brazing material employed.

The drawing illustrates a contact assembly representative of those made in accordance with this invention. A tungsten contact disc is secured to a supporting member of iron or steel by an intermediate brazing material or alloy which consists of nickel or a low melting point nickel alloy in which the nickel constitutes the major portion of the alloy.

Assemblies made in accordance with this invention may be allowed to remain idle for an extended period in warm humid atmospheres without the production of the dark colored, mold like deposit.

To illustrate the effectiveness of assemblies made in accordance with this invention, representative assemblies made in accordance with conventional practice in which a copper alloy material was used as the brazing material and representative assemblies using nickel as the brazing material were supported in a closed jar above water to issue a moist atmosphere; the jar being maintained at room temperatures. The assemblies included steel screws having mounted at one end a tungsten contact disc and steel breaker arms upon which had been mounted tungsten contact discs in accordance with usual mounting practice.

At the end of five days the assemblies were carefully inspected. The assemblies made with copper and copper alloy brazing materials had a considerable amount of the dark colored deposit upon the sides of the tungsten discs. The dark deposit had not yet begun to creep or grow across the face of the discs. The assemblies made in accordance with the present invention had substantially the same appearance as when placed in the moist atmosphere.

A further inspection of these assemblies was made at the end of four weeks. In most of the assemblies made in accordance with the usual practice the dark colored deposit had crept around and over the face of the tungsten contact. In some instances rather large globules of the deposit covered the surface of the tungsten disc. This deposit has an extremely high electrical resistance and the presence of only a very thin film is sufficient to cause an open circuit at the usual automotive ignition system voltages. Assemblies made in accordance with this invention appeared to be in substantiallly the same condition as when they were placed in the jar at the beginning of the test. The surface of the tungsten discs were clean and exhibited merely a very slight coloration.

The term "iron" is used herein and in the claim in a generic sense to include steels.

It is obvious that various modifications will suggest themselves to those skilled in the art. In place of heating the entire assembly to a temperature at which the nickel or nickel alloy brazing material melts or fuses, other common well known methods may be employed wherein only the contact disc, the brazing wafer and that portion of the supporting member underlying the contact disc are heated such as heating by induction, resistance welding and the like.

We claim:

An electrical contact assembly resistant to the action of warm, humid atmospheres, comprising a ferrous supporting member and a tungsten contact member secured to the ferrous member by an intermediate thin layer of nickel, the area of the nickel being substantially the same as that of the contact member.

GILBERT HALVERSON.
JOHN D. KLEIS.

REFERENCES CITED

The following references are of record in the file of this patent:

UNITED STATES PATENTS

| Number | Name | Date |
|---|---|---|
| 1,089,907 | Coolidge | Mar. 10, 1914 |
| 1,614,501 | Stoekle | Jan. 18, 1927 |
| 1,657,053 | Weiger | Jan. 24, 1928 |
| 2,281,446 | Laise | Apr. 28, 1942 |
| 2,333,622 | McNab | Nov. 2, 1943 |
| 2,387,903 | Hensel | Oct. 30, 1945 |
| 2,427,727 | Huntley | Sept. 23, 1947 |
| 2,464,591 | Larson et al. | Mar. 15, 1949 |